(12) United States Patent
Lee et al.

(10) Patent No.: US 11,769,877 B2
(45) Date of Patent: Sep. 26, 2023

(54) POSITIVE ELECTRODE FOR LITHIUM SECONDARY BATTERY, PREPARATION METHOD THEREOF, AND LITHIUM SECONDARY BATTERY INCLUDING SAME

(71) Applicant: LG Chem, Ltd., Seoul (KR)

(72) Inventors: Joo Sung Lee, Daejeon (KR); Ho June Kim, Daejeon (KR); Min Ji Heo, Daejeon (KR)

(73) Assignee: LG Energy Solution, Ltd.

( * ) Notice: Subject to any disclaimer, the term of this patent is extended or adjusted under 35 U.S.C. 154(b) by 404 days.

(21) Appl. No.: 16/621,752

(22) PCT Filed: Jul. 11, 2018

(86) PCT No.: PCT/KR2018/007877
§ 371 (c)(1),
(2) Date: Dec. 12, 2019

(87) PCT Pub. No.: WO2019/017643
PCT Pub. Date: Jan. 24, 2019

(65) Prior Publication Data
US 2020/0144618 A1  May 7, 2020

(30) Foreign Application Priority Data

Jul. 17, 2017  (KR) .................. 10-2017-0090244

(51) Int. Cl.
*H01M 4/525* (2010.01)
*H01M 4/505* (2010.01)
(Continued)

(52) U.S. Cl.
CPC ........... *H01M 4/525* (2013.01); *H01M 4/505* (2013.01); *H01M 10/0525* (2013.01);
(Continued)

(58) Field of Classification Search
CPC .. H01M 4/505; H01M 4/525; H01M 10/0525; H01M 2004/021; H01M 2004/027; H01M 2004/028
See application file for complete search history.

(56) References Cited

U.S. PATENT DOCUMENTS

2005/0202316 A1  9/2005 Hwang et al.
2006/0105241 A1  5/2006 Tode et al.
(Continued)

FOREIGN PATENT DOCUMENTS

CN    104471759 A    3/2015
CN    105164834 A    12/2015
(Continued)

OTHER PUBLICATIONS

Search Report dated Nov. 23, 2021 from Office Action for Chinese Application No. 201880037851.X dated Dec. 2, 2021. 2 pgs.
(Continued)

*Primary Examiner* — Ula C Ruddock
*Assistant Examiner* — Armindo Carvalho, Jr.
(74) *Attorney, Agent, or Firm* — Lerner David LLP

(57) ABSTRACT

The present invention provides a positive electrode for a lithium secondary battery, including a first positive electrode active material including a lithium cobalt-based oxide, and a second positive electrode active material including a lithium composite transition metal oxide containing at least two selected from the group consisting of nickel (Ni), cobalt (Co), and manganese (Mn), wherein, when the state of charge (SOC) of the first positive electrode active material in which the voltage of the lithium secondary battery reaches a constant voltage (CV) at 1 C-rate is referred to as $SOC_1$, and the state of charge (SOC) of the second positive electrode active material in which the voltage of the battery reaches a constant voltage (CV) at 1 C-rate is referred to as
(Continued)

$SOC_2$, the $SOC_1$ and the $SOC_2$ satisfy the relationship represented by Equation 1 below.

$$SOC_1 < SOC_2 < 1.1 \times SOC_1 \quad \text{[Equation 1]}$$

10 Claims, 4 Drawing Sheets

(51) Int. Cl.
  *H01M 10/0525* (2010.01)
  *H01M 4/02* (2006.01)
(52) U.S. Cl.
  CPC .......................... *H01M 2004/021* (2013.01); *H01M 2004/027* (2013.01); *H01M 2004/028* (2013.01)

(56) References Cited

U.S. PATENT DOCUMENTS

| | | | |
|---|---|---|---|
| 2011/0311872 A1 | 12/2011 | Oh et al. | |
| 2014/0050985 A1 | 2/2014 | Lee et al. | |
| 2015/0162598 A1* | 6/2015 | Kim | H01M 4/364 429/223 |
| 2016/0133929 A1 | 5/2016 | Hah et al. | |
| 2016/0197340 A1 | 7/2016 | Lee et al. | |
| 2016/0211517 A1* | 7/2016 | Beck | H01M 4/505 |
| 2017/0062812 A1 | 3/2017 | Kim et al. | |
| 2017/0309907 A1* | 10/2017 | Mitsumoto | H01M 4/362 |

FOREIGN PATENT DOCUMENTS

| | | |
|---|---|---|
| CN | 105474449 A | 4/2016 |
| EP | 2405511 A2 | 1/2012 |
| EP | 2882014 A1 | 6/2015 |
| JP | 2006164934 A | 6/2006 |
| JP | 2007042302 A | 2/2007 |
| JP | 2008234872 A | 10/2008 |
| JP | 2015528181 A | 9/2015 |
| KR | 20060029048 A | 4/2006 |
| KR | 20140024587 A | 3/2014 |
| KR | 101527996 B1 | 6/2015 |
| KR | 101551520 B1 | 9/2015 |
| KR | 20170025992 A | 3/2017 |
| KR | 20170063387 A | 6/2017 |
| WO | 2016175313 A1 | 11/2016 |
| WO | 2019017643 A2 | 1/2019 |

OTHER PUBLICATIONS

Extended European Search Report including Written Opinion for Application No. EP18835882.4 dated Jun. 17, 2020, 7 pgs.
International Search Report for PCT/KR2018/007877 dated Feb. 25, 2019, 4 pages.

* cited by examiner

POSITIVE ELECTRODE FOR LITHIUM SECONDARY BATTERY, PREPARATION METHOD THEREOF, AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2018/007877 filed Jul. 11, 2018, the disclosure of which is incorporated herein in its entirety by reference, which claims priority to Korean Patent Application Nos. 10-2017-0090244, filed on Jul. 17, 2017, in the Korean Intellectual Property Office, the disclosures of which are incorporated herein in its entirety by reference.

TECHNICAL FIELD

The present invention relates to a preparation method of a positive electrode for a secondary battery, a positive electrode for a secondary battery prepared thereby, and a lithium secondary battery including the same.

BACKGROUND ART

As demand for mobile devices have increased with the development of mobile device technology, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal composite oxide has been used. Among such oxides, a lithium cobalt oxide of $LiCoO_2$ having a high operating voltage and excellent capacity properties has been mainly used. However, Co is expensive, and due to supply instability thereof, there is a limitation in using a large amount of Co as a material for a power source for applications such as the electric vehicle field.

Accordingly, a nickel cobalt manganese-based lithium composite metal oxide (hereinafter, simply referred to as 'NCM-based lithium oxide') in which a portion of Co is substituted with Ni and Mn has been developed. There has been a need to blend such NCM-based lithium oxide with lithium cobalt-based oxide and apply the same.

An NCM-based lithium oxide has excellent reversible capacity and thermal stability applicable to lithium secondary batteries. However, compared with a lithium cobalt-based oxide, an NCM-based lithium oxide has a too high lithium ion desorption rate at the time of charging. Therefore, when a lithium cobalt-based oxide and a currently commercialized NCM-based lithium oxide are simply blended, the lithium ion insertion rate does not reach the lithium ion desorption rate in a negative electrode, so that a side reaction and a precipitation reaction may occur on the surface of the negative electrode. Accordingly, when a lithium cobalt-based oxide and a currently commercialized NCM-based lithium oxide are simply blended, the capacity characteristics and the cycle characteristics of a battery may deteriorate. In order to prevent such limitation, methods of coating a negative electrode thin film to allow for a high rate charging of a negative electrode, or using carbon-coated artificial graphite having improved charging characteristics, and the like have been studied. However, such methods increased manufacturing cost and had a limitation in preventing the deterioration of battery characteristics.

DISCLOSURE OF THE INVENTION

Technical Problem

An aspect of the present invention provides a positive electrode for a lithium secondary battery, the positive electrode capable of suppressing the occurrence of a side reaction and precipitation in a negative electrode when a lithium cobalt oxide and a lithium composite transition metal oxide are mixed and used, and improving the battery capacity and the cycle characteristics.

Technical Solution

According to an aspect of the present invention, there is provided a positive electrode for a lithium secondary battery, the positive electrode including a first positive electrode active material having a lithium cobalt-based oxide, and a second positive electrode active material having a lithium composite transition metal oxide with at least two selected from the group consisting of nickel (Ni), cobalt (Co), and manganese (Mn). when the state of charge (SOC) of the first positive electrode active material in which the voltage of the lithium secondary battery reaches a constant voltage (CV) at 1 C-rate is referred to as $SOC_1$, and the state of charge (SOC) of the second positive electrode active material in which the voltage of the battery reaches a constant voltage (CV) at 1 C-rate is referred to as $SOC_2$, the $SOC_1$ and the $SOC_2$ satisfy the relationship represented by Equation 1 below.

$$SOC_1 < SOC_2 < 1.1 \times SOC_1 \qquad \text{[Equation 1]}$$

In addition, according to another aspect of the present invention, there is provided a lithium secondary battery including the positive electrode.

In addition, according to another aspect of the present invention, there is provided a method for preparing a positive electrode for a lithium secondary battery, the method including preparing a first positive electrode active material including a lithium cobalt-based oxide, and a second positive electrode active material including a lithium composite transition metal oxide containing at least two selected from the group consisting of nickel (Ni), cobalt (Co), and manganese (Mn), and mixing the first positive electrode active material and the second positive electrode active material. when the state of charge (SOC) of the first positive electrode active material in which the voltage of the lithium secondary battery reaches a constant voltage (CV) at 1 C-rate is referred to as $SOC_1$, and the state of charge (SOC) of the second positive electrode active material in which the voltage of the battery reaches a constant voltage (CV) at 1 C-rate is referred to as $SOC_2$, the $SOC_1$ and the $SOC_2$ satisfy the relationship represented by Equation 1 below.

$$SOC_1 < SOC_2 < 1.1 \times SOC_1 \qquad \text{[Equation 1]}$$

ADVANTAGEOUS EFFECTS

According to the present invention, the occurrence of a side reaction and precipitation in a negative electrode may be suppressed when a lithium cobalt oxide and a lithium composite transition metal oxide are mixed and used, and the battery capacity and the cycle characteristics may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
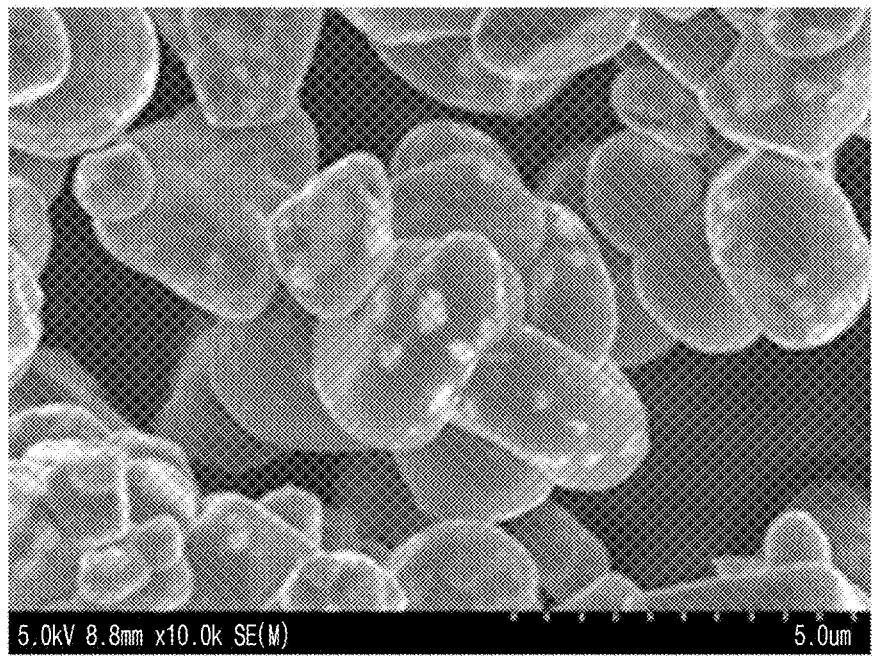
FIG. 1 is an SEM photograph of the second positive electrode active material used in Example 1.

Hereinafter, the present invention will be described in more detail to facilitate understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode for a lithium secondary battery of the present invention includes a first positive electrode active material including a lithium cobalt-based oxide, and a second positive electrode active material including a lithium composite transition metal oxide having at least two selected from the group consisting of nickel (Ni), cobalt (Co), and manganese (Mn). when the state of charge (SOC) of the first positive electrode active material in which the voltage of the lithium secondary battery reaches a constant voltage (CV) at 1 C-rate is referred to as $SOC_1$, and the state of charge (SOC) of the second positive electrode active material in which the voltage of the battery reaches a constant voltage (CV) at 1 C-rate is referred to as $SOC_2$, the $SOC_1$ and the $SOC_2$ satisfy the relationship represented by Equation 1 below.

$$SOC_1 < SOC_2 < 1.1 \times SOC_1 \quad [\text{Equation 1}]$$

When a lithium cobalt-based oxide and an NCM-based lithium oxide are simply blended, since the NCM-based lithium oxide has a higher lithium ion desorption rate at the time of charging compared with the lithium cobalt-based oxide, the lithium ion insertion rate does not reach the lithium ion desorption rate, so that a side reaction and precipitation may occur in a negative electrode, and the capacity characteristics and the cycle characteristics of a battery may deteriorate.

Accordingly, in the present invention, the charge/discharge profile of a second positive electrode active material of a lithium composite transition metal oxide having at least two selected from the group consisting of nickel (Ni), cobalt (Co), and manganese (Mn) is adjusted such that the charge/discharge profile of a first positive electrode active material and the second positive electrode active material satisfy Formula 1 above, and thus, when the first positive electrode active material and the second positive electrode active material are mixed and used, the occurrence of a side reaction and precipitation in a negative electrode is suppressed, and the battery capacity and the cycle characteristics are significantly improved.

The first positive electrode active material may be a lithium cobalt-based oxide represented by Formula 1 below.

$$Li_{a1}Co_{1-x1}M^1_{x1}O_{2+\beta} \quad [\text{Formula 1}]$$

In Formula 1, $M^1$ includes at least one selected from the group consisting of Al, B, Ba, Ca, Zr, Ti, Mg, Ta, Nb, Sr, W, and Mo, and $0.9 < a1 \leq 1.1$, $0 \leq x1 \leq 0.2$, and $0 \leq \beta \leq 0.02$.

The second positive electrode active material may be a lithium composite transition metal oxide represented by Formula 2 below.

$$Li_{a2}Ni_{x2}Mn_{y2}Co_{z2}M^2_{w2}O_{2+\delta} \quad [\text{Formula 2}]$$

In Formula 2, $M^2$ includes at least one selected from the group consisting of Al, B, Ba, Ca, Zr, Ti, Mg, Ta, Nb, Sr, W, and Mo, and $0.9 < a2 \leq 1.1$, $0.3 \leq x2 \leq 0.95$, $0 < y2 \leq 0.4$, $0 < z2 \leq 0.5$, $0 \leq w2 \leq 0.1$, $0 \leq \delta \leq 0.02$, and $x2+y2+z2+w2=1$.

In order to allow the first positive electrode active material and the second positive electrode active material to satisfy Equation 1 above, the surface resistance of the lithium composite transition metal oxide (for example, an NCM-based lithium oxide), which is the second positive electrode active material, is increased such that the charge/discharge profile of the first positive electrode active material and the second positive electrode active material may be adjusted to be similar to each other.

Methods for increasing the surface resistance of the second positive electrode active material may be, for example, increasing the single crystal size of the second positive electrode active material by overfiring in a firing process to a temperature increased by about 50° C. from the range of about 800° C. to 1000° C., which is a typical positive electrode active material firing temperature range, or significantly increasing the content of a doping element or a coating material of the secondary positive electrode active material. However, the embodiment of the present invention is not limited to such methods for increasing resistance, and any method is applicable as long as it is a method which is capable of adjusting charge/discharge profile such that the first positive electrode active material and the second positive electrode active material satisfy the relationship of Equation 1 above.

In an embodiment of the present invention, the second positive electrode active material of a lithium composite transition metal oxide (for example, an NCM-based lithium oxide) may have a single crystal size of 180 to 800 nm, preferably 200 to 500 nm, and most preferably 220 to 400 nm. When the single crystal size of the second positive electrode active material satisfies the above range, the surface resistance is increased and the lithium ion desorption rate is reduced, so that the relationship of Formula 1 may be satisfied. Furthermore, a side reaction and precipitation in a negative electrode may be suppressed, and the battery capacity and the cycle characteristics may be improved. In addition, when the single crystal size of the second positive electrode active material satisfies the above range, the rate characteristic deterioration during a high rate discharge may be reduced while increasing the resistance.

In addition, in an embodiment of the present invention, the second positive electrode active material of a lithium composite transition metal oxide (for example, an NCM-based lithium oxide) may contain a coated or doped element, and the total content of the coated or doped element may be 1,000 ppm or more, more preferably, 1,500 to 5,000 ppm, and most preferably, 3,000 to 5,000 ppm. When the total content of the coated or doped element of the second positive electrode active material satisfies the above range of 1,000 ppm or more, the surface resistance is increased and the lithium ion desorption rate is reduced, so that the relationship of Formula 1 may be satisfied. Furthermore, a side reaction and precipitation in a negative electrode may be suppressed, and the battery capacity and the cycle characteristics may be improved. The coated or doped element may be, for example, one or more selected from the group consisting of Al, B, Ba, Ca, Zr, Ti, Mg, Ta, Nb, Sr, W, and Mo.

The first positive electrode active material of a lithium cobalt-based oxide and the second positive electrode active material of a lithium composite transition metal oxide (for example, an NCM-based lithium oxide) may be mixed at a weight ratio of 90:10 to 30:70, and more preferably, 80:20 to 50:50. By mixing the first positive electrode active material and the second positive electrode active material at a weight ratio within the above range, manufacturing cost may be reduced while increasing battery capacity, and improving stability and lifespan characteristics.

The positive electrode for a lithium secondary battery of the present invention may be in which a positive electrode mixture layer including the first and second positive electrode active materials is formed on a positive electrode current collector.

The first and second positive electrode active materials may be included in an amount of 80 to 98 wt %, more specifically 85 to 98 wt % based on the total weight of the positive electrode mixture layer. When included in the above content range, excellent capacity characteristics may be achieved.

The positive electrode current collector is not particularly limited as long as it has conductivity without causing adverse chemical changes in the battery. For example, stainless steel, aluminum, nickel, titanium, fired carbon, or aluminum or stainless steel that is surface-treated with one of carbon, nickel, titanium, silver, or the like may be used. In addition, the positive electrode current collector may typically have a thickness of 3 μm to 500 μm, and microscopic irregularities may be formed on the surface of the positive electrode current collector to improve the adhesion of the positive electrode active material. The positive electrode current collector, for example, may be used in various shapes such as that of a film, a sheet, a foil, a net, a porous body, a foam body, a non-woven fabric body, and the like.

The positive electrode mixture layer includes the positive electrode active material and the second positive electrode active material, and may further include a conductive material and a binder.

The conductive material is used to impart conductivity to an electrode, and any conductive material may be used without particular limitation as long as it has electron conductivity without causing a chemical change in a battery to be constituted. Specific examples of the conductive material may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

The binder serves to improve the bonding between positive electrode active material particles and the adhesion between the positive electrode active material and the positive electrode current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of a positive electrode mixture layer.

Hereinafter, a method for preparing the positive electrode for a lithium secondary battery according to the present invention will be described.

The method for preparing a positive electrode for a lithium secondary battery of the present invention includes preparing a first positive electrode active material including a lithium cobalt-based oxide, and a second positive electrode active material including a lithium complex transition metal oxide containing at least two selected from the group consisting of nickel (Ni), cobalt (Co), and manganese (Mn), and mixing the first positive electrode active material and the second positive electrode active material, wherein, when the state of charge (SOC) of the first positive electrode active material in which the voltage of the lithium secondary battery reaches a constant voltage (CV) at 1 C-rate is referred to as $SOC_1$, and the state of charge (SOC) of the second positive electrode active material in which the voltage of the battery reaches a constant voltage (CV) at 1 C-rate is referred to as $SOC_2$, the $SOC_1$ and the $SOC_2$ satisfy the relationship represented by Equation 1 below:

$$SOC_1 < SOC_2 < 1.1 \times SOC_1 \qquad \text{[Equation 1]}$$

The type, mixing weight ratio and content of the positive electrode active material and the second positive electrode active material are the same as previously described.

In an embodiment of the present invention, the preparing of the second positive electrode active material may include a process for preparing a second positive electrode active material by using a solid-phase reaction method. Typically, an NCM-based positive electrode active material is prepared by co-precipitation among wet chemical methods. However, in the embodiment of the present invention, a second positive electrode active material is prepared by using a solid-phase reaction method in which heat treatment is performed at a high temperature for a long period of time, so that the surface resistance may be increased.

In addition, in an embodiment of the present invention, in the preparing of the second positive electrode active material, the second positive electrode active material may be prepared by overfiring so as to have a single crystal size of 180 to 800 nm. At this time, by overfiring such that the single crystal size of the second positive electrode active material is 180 to 800 nm, the surface resistance of the second positive electrode active material may be increased, and the lithium ion desorption rate may be reduced to satisfy the relationship of Equation 1 above.

In addition, in an embodiment of the present invention, preparing of the second positive electrode active material may include a process for allowing the second positive electrode active material to contain a coated or doped element, and the total content of the coated or doped element to be 1,000 ppm or more, and more preferably, 1,500 to 5,000 ppm. The process of coating or doping may be doping a precursor through a co-precipitation reaction at the time of forming a positive electrode active material precursor, adding and doping a doping raw material together at the time of mixing and firing a positive electrode active material precursor and a lithium source, or coating/doping by forming a lithium composite transition metal oxide and then adding a coating/doping raw material followed by secondary firing. Any typical coating or doping process of a positive electrode active material may be applied without limitation. At this time, the coated or doped element may be, for example, one or more selected from the group consisting of Al, B, Ba, Ca, Zr, Ti, Mg, Ta, Nb, Sr, W, and Mo.

The preparing of a positive electrode for a lithium secondary battery may include a process for forming a positive electrode mixture layer including the first positive electrode active material and the second positive electrode active material on a positive electrode current collector.

In order to form the positive electrode mixture layer, a first and second positive electrode active material, a conductive material, and a binder may be dissolved or dispersed in a solvent to prepare a composition for forming a positive electrode. The type and the content of the first and second positive electrode active materials, the conductive material, and the binder are the same as previously described.

Meanwhile, the solvent for preparing a composition for forming a positive electrode may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. An amount of the solvent used is sufficient if the solvent may dissolve or disperse the positive electrode active material coated with a radical polymer, the conductive material, and the binder in consideration of an applying thickness of a slurry and preparing yield, and may allow to have a viscosity which exhibits excellent thickness uniformity during the subsequent applying for the preparing of the positive electrode.

Next, the positive electrode may be prepared by applying the composition for forming a positive electrode on the positive electrode current collector, followed by drying and rolling the applied positive electrode current collector.

Also, as another method, the positive electrode may be prepared by casting the composition for forming a positive electrode active material on a separate support and then laminating a film separated from the support on the positive electrode current collector.

According to another embodiment of the present invention, there is provided an electrochemical device including the positive electrode. The electrochemical device may specifically be a battery, a capacitor and the like, and more specifically, a lithium secondary battery.

The lithium secondary battery specifically includes a positive electrode, a negative electrode disposed to face the positive electrode, a separator disposed between the positive electrode and the negative electrode, and an electrolyte. At this time, the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode current collector and a negative electrode mixture layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, and an aluminum-cadmium alloy may be used. Also, the negative electrode collector may typically have a thickness of 3 μm to 500 μm, and as in the case of the positive electrode current collector, microscopic irregularities may be prepared on the surface of the negative electrode current collector to improve the adhesion of a negative electrode active material. The negative electrode current collector may be used in various forms of such as a film, a sheet, a foil, a net, a porous body, a foam body, and a non-woven fabric body.

The negative electrode mixture layer may selectively include a binder and a conductive material in addition to the negative electrode active material.

As the negative electrode active material, a compound capable of reversibly intercalating and deintercalating lithium may be used. Specific examples of the negative electrode active material may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_\beta(0<\beta<2)$, $SnO_2$, vanadium oxide, lithium titanium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those previously described in the description of the positive electrode.

The negative electrode mixture layer may be prepared by, for example, applying, on the negative electrode current collector, the negative electrode active material and a composition for forming a negative electrode which is prepared by selectively dissolving or dispersing the binder and the conductive material in the solvent, and drying the applied negative electrode current collector, or may be prepared by casting the composition for forming a negative electrode on a separate support and then laminating a film separated from the support on the negative electrode current collector.

Meanwhile, in the lithium secondary battery, a separator separates the negative electrode and the positive electrode and provides a movement path for lithium ions. Any separator may be used without particular limitation as long as it is typically used as a separator in a lithium secondary battery. Particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEV).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

The external shape of the lithium secondary battery of the present invention is not particularly limited, but may be a cylindrical shape using a can, a prismatic shape, a pouch shape, a coin shape, and the like.

The lithium secondary battery according to the present invention may be used not only in a battery cell used as a power source of a small device but also as a unit cell in a medium and large sized battery module including a plurality of battery cells.

Hereinafter, examples of the present invention will be described in detail in such a manner that it may easily be carried out by a person with ordinary skill in the art to which the present invention pertains. The present invention may, however, be embodied in many different forms and should not be construed as being limited to the examples set forth herein.

Example 1

$LiCoO_2$ as a first positive electrode active material, $LiNi_{0.5}Co_{0.2}Mn_{0.3}O_2$ as a second positive electrode active material, which was prepared by using a solid-phase reaction method and overfired at 980° C. so as to have an average single crystal size of 285 nm, carbon black, and a PVdF binder were mixed in an N-methylpyrrolidone solvent at a weight ratio of 67.55:28.95:1.5:2.0 to prepare a composition for forming a first positive electrode. Then, the prepared composition was applied on one surface of an aluminum current collector, dried at 130° C., and then rolled to prepare a positive electrode.

FIG. 1 is an SEM photograph of a second positive electrode active material. Since the surface morphology of the overfired second positive electrode active material is smooth, it can be confirmed that the surface resistance is increased.

Example 2

$LiCoO_2$ as a first positive electrode active material, $LiNi_{0.5}Co_{0.3}Mn_{0.2}O_2$ as a second positive electrode active material, in which coating/doping elements Al, B, and Zr are coated/doped to 4,500 ppm, carbon black, and a PVdF binder were mixed in an N-methylpyrrolidone solvent at a weight ratio of 67.55:28.95:1.5:2.0 to prepare a composition for forming a first positive electrode. Then, the prepared composition was applied on one surface of an aluminum current collector, dried at 130° C., and then rolled to prepare a positive electrode.

Figure 2:
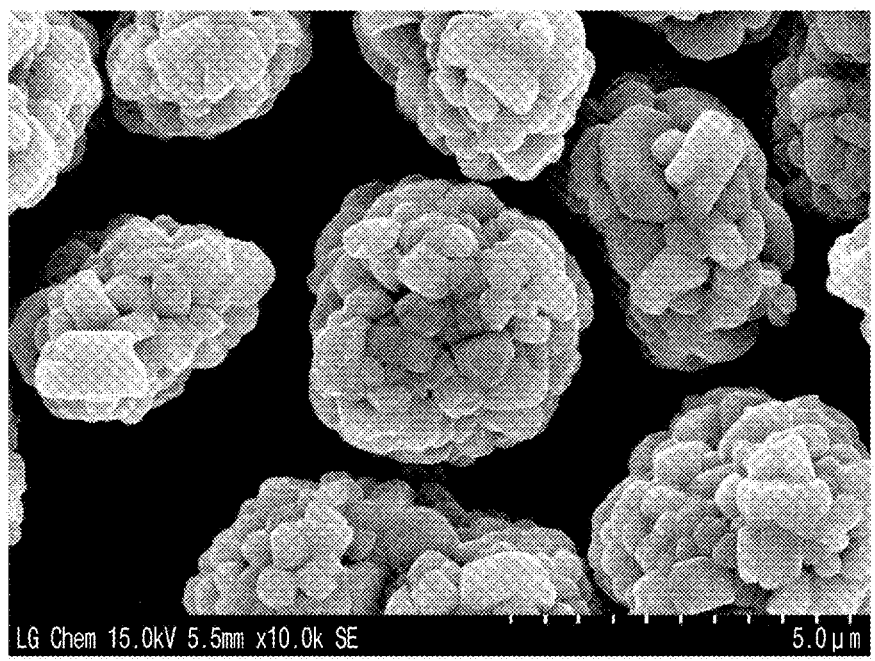
FIG. 2 is an SEM photograph of the second positive electrode active material used in Example 2.

An SEM photograph of a second positive electrode active material used in Example 2 is shown in FIG. 2.

Comparative Example 1

$LiCoO_2$ as a first positive electrode active material, $LiNi_{0.5}Co_{0.3}Mn_{0.2}O_2$ as a second positive electrode active material, which has not subjected to a treatment for increasing surface resistance, carbon black, and a PVdF binder were mixed in an N-methylpyrrolidone solvent at a weight ratio of 67.55:28.95:1.5:2.0 to prepare a composition for forming a first positive electrode. Then, the prepared composition was applied on one surface of an aluminum current collector, dried at 130° C., and then rolled to prepare a positive electrode.

Comparative Example 2

$LiCoO_2$ as a first positive electrode active material, $LiNi_{0.5}Co_{0.3}Mn_{0.2}O_2$ as a second positive electrode active material, in which coating/doping elements B, and Zr are coated/doped to 700 ppm, carbon black, and a PVdF binder were mixed in an N-methylpyrrolidone solvent at a weight ratio of 67.55:28.95:1.5:2.0 to prepare a composition for forming a first positive electrode. Then, the prepared composition was applied on one surface of an aluminum current collector, dried at 130° C., and then rolled to prepare a positive electrode.

Figure 3:
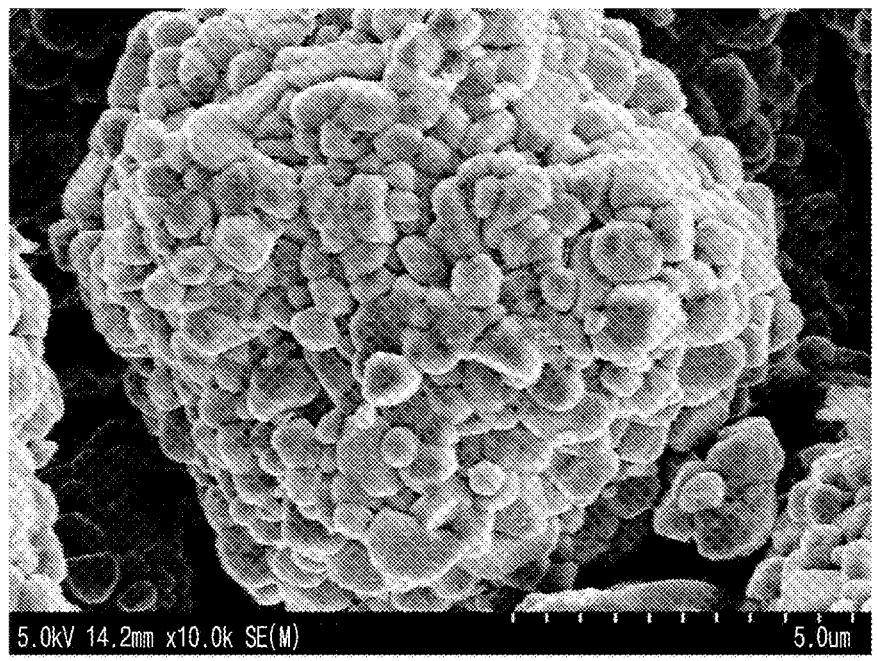
FIG. 3 is an SEM photograph of the second positive electrode active material used in Comparative Example 2.

An SEM photograph of a second positive electrode active material used in Comparative Example 2 is shown in FIG. 3.

The single crystal size, and doping or coating content of the second positive electrode active material used in Examples 1 and 2 and Comparative Examples 1 and 2 are shown in Table 1 below.

The single crystal size was measured by X-ray diffraction (XRD), and the coating/doping content was measured by Inductively Coupled Plasma (ICP).

TABLE 1

|  | Single crystal size (nm) | Coating/doping content (ppm) |
| --- | --- | --- |
| Example 1 | 285 | — |
| Example 2 | 157 | 4,500 |
| Comparative Example 1 | 151 | — |
| Comparative Example 2 | 156 | 700 |

Experimental Example 1: Output Characteristics According to SOC of LCO and NCM Positive Electrode Active Materials In order to measure the output change according to the SOC of each of the first positive electrode active materials LCO and the second positive electrode active materials NCM used in Examples 1 and 2 and Comparative Examples 1 and 2, a positive electrode was prepared by using each of the first positive electrode active material LCO and the second positive electrode active material NCM alone, which were used in Examples 1 and 2 and Comparative Examples 1 and 2, and then a secondary battery cell including the positive electrode was prepared.

Specifically, natural graphite as a negative electrode active material, carbon black conductive material, and SBR/CMC binder were mixed in an N-methylpyrrolidone solvent at a weight ratio of 97:0.5:2.5 to prepare a composition for forming a negative electrode, and then the composition was applied on one surface of a copper current collector to prepare a negative electrode.

A porous polyethylene separator was interposed between the positive electrode and the negative electrode which were prepared as above to prepare an electrode assembly, and then the electrode assembly was disposed in a case. Thereafter, an electrolyte was injected into the case to prepare a lithium secondary battery. At this time, the electrolyte was prepared by dissolving lithium hexafluorophosphate ($LiPF_6$) of 1.0 M concentration in an organic solvent made of ethylene carbonate/propylene carbonate/diethyl carbonate (mixing volume ratio of EC/PC/DEC=3/1/6).

The output change according to the SOC in a voltage range of 4.35 V to 3.0 V at the time of 1 C charge was measured with respect to the full cell lithium secondary battery, and the results are shown in Table 2 below.

TABLE 2

|  | SOC of first positive electrode active material reaching CV at charge rate of 1 C ($SOC_1$) | SOC of second positive electrode active material reaching CV at charge rate of 1 C ($SOC_2$) |
| --- | --- | --- |
| Example 1 | 77.8% | 81.5% |
| Example 2 | 77.8% | 84.1% |
| Comparative Example 1 | 77.8% | 91.4% |
| Comparative Example 2 | 77.8% | 89.5% |

Referring to Table 2, in Example 1 and Example 2, $SOC_1 < SOC_2 < 1.1 \times SOC_1$ was satisfied, while in Comparative Example 1 and Comparative Example 2, Equation 1 above was not satisfied.

Experimental Example: Output Characteristics According to SOC of Mixed Positive Electrode Active Material Battery A secondary battery cell was prepared by using the positive electrode prepared in Examples 1 and 2 and Comparative Examples 1 and 2.

Specifically, natural graphite as a negative electrode active material, carbon black conductive material, and SBR/CMC binder were mixed in an N-methylpyrrolidone solvent at a weight ratio of 97:0.5:2.5 to prepare a composition for forming a negative electrode, and then the composition was applied on one surface of a copper current collector to prepare a negative electrode.

A porous polyethylene separator was interposed between the positive electrode and the negative electrode which were prepared as above to prepare an electrode assembly, and then the electrode assembly was disposed in a case. Thereafter, an electrolyte was injected into the case to prepare a lithium secondary battery. At this time, the electrolyte was prepared by dissolving lithium hexafluorophosphate ($LiPF_6$) of 1.0 M concentration in an organic solvent made of ethylene carbonate/propylene carbonate/diethyl carbonate (mixing volume ratio of EC/PC/DEC=3/1/6).

The output change according to the SOC in a voltage range of 4.35 V to 3.0 V at the time of 1 C charge was measured with respect to the full cell lithium secondary battery, and the results are shown in Table 3 below and FIG. 4.

Experimental Example 3: Evaluation of Battery Characteristics

The full cell lithium secondary battery prepared in Experimental Example 1 was charged until 0.1 C and 4.1 V were reached at 25° C. in the CCCV mode (Termination current 1/20 C), and discharged at a constant current of 0.5 C until 3.0 V was reached. The charge/discharge were repeated for 150 times. The results are shown in Table 3 below.

TABLE 3

| | Initial capacity (mAh/g) | SOC reaching CV at 1 C charge (Increased amount compared to LCO alone) | Capacity retention rate (%) (@150$^{th}$ cycle) |
|---|---|---|---|
| Example 1 | 4,620 | 81.2% (4.3%) | 95.5% |
| Example 2 | 4,620 | 83.6% (7.5%) | 94.3% |
| Comparative Example 1 | 4,620 | 91.2% (17.2%) | 12.3% |
| Comparative Example 2 | 4,620 | 88.9% (14.3%) | 33.2% |

Figure 4:
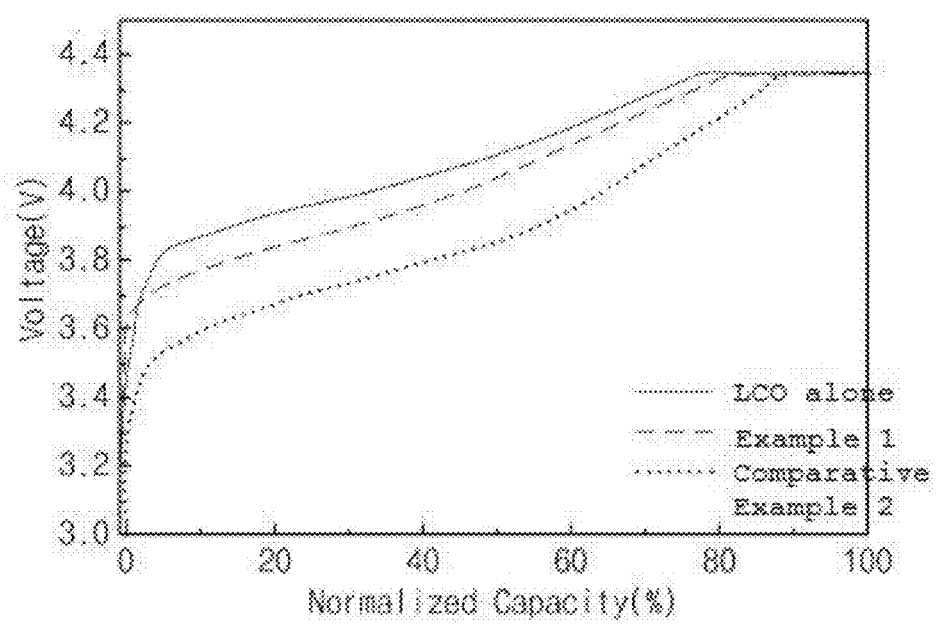
FIG. 4 is a graph showing the change in output according to the SOC at the time of 1 C charge of a lithium secondary battery using the positive electrodes of Example 1 and Comparative Example 2.

Referring to Table 3 and FIG. 4, in Examples 1 and 2, in which $SOC_1<SOC_2<1.1\times SOC_1$ was satisfied, the charge/discharge profile was similar to the LCO alone charge/discharge profile compared with Comparative Example 1 and Comparative Example 2, and therefore, it can be confirmed that a side reaction and precipitation in the negative electrode were suppressed and the cycle characteristics were significantly improved.

The invention claimed is:

1. A positive electrode for a lithium secondary battery, comprising:
   a first positive electrode active material including a lithium cobalt-based oxide; and
   a second positive electrode active material including a lithium composite transition metal oxide containing at least two selected from the group consisting of nickel (Ni), cobalt (Co), and manganese (Mn),
   wherein the second positive electrode active material has a single crystal size of 200 to 500 nm and is represented by Formula 2 below:

$Li_{a2}Ni_{x2}Mn_{y2}CO_{z2}M^2_{w2}O_{2+\delta}$ [Formula 2]

(in Formula 2, $M^2$ includes at least one selected from the group consisting of Al, B, Ba, Ca, Zr, Ti, Mg, Ta, Nb, Sr, W, and Mo, and $0.9<a2\leq1.1$, $0.3\leq x2\leq0.95$, $0<y2\leq0.4$, $0<z2\leq0.5$, $0\leq w2\leq0.1$, $0\leq\delta\leq0.02$, and $x2+y2+z2+w2=1$) wherein, when the state of charge (SOC) of the first positive electrode active material in which the voltage of the lithium secondary battery reaches a constant voltage (CV) at 1 C-rate is referred to as $SOC_1$, and the state of charge (SOC) of the second positive electrode active material in which the voltage of the battery reaches a constant voltage (CV) at 1 C-rate is referred to as $SOC_2$, the $SOC_1$ and the $SOC_2$ satisfy the relationship represented by Equation 1 below:

$SOC_1<SOC_2<1.1\times SOC_1$. [Equation 1]

2. The positive electrode of claim 1, wherein the first positive electrode active material is represented by Formula 1 below:

$Li_{a1}CO_{1-x}1M^1_{x1}O_{2+\beta}$ [Formula 1]

(in Formula 1, $M^1$ includes at least one selected from the group consisting of Al, B, Ba, Ca, Zr, Ti, Mg, Ta, Nb, Sr, W, and Mo, and $0.9<a1\leq1.1$, $0\leq x1\leq0.2$, and $0\leq\beta\leq0.02$).

3. The positive electrode of claim 1, wherein the second positive electrode active material contains a coated or doped element, and the total content of the coated or doped element is 1,000 ppm or more.

4. The positive electrode of claim 1, wherein the first positive electrode active material and the second positive electrode active material are mixed at a weight ratio of 90:10 to 30:70.

5. A method for preparing the positive electrode for a lithium secondary battery of claim 1, the method comprising:
   preparing the first positive electrode active material, and the second positive electrode active material; and
   mixing the first positive electrode active material and the second positive electrode active material, wherein,
   when the state of charge (SOC) of the first positive electrode active material reaches $SOC_1$, and the state of charge (SOC) of the second positive electrode active material reaches $SOC_2$, the relationship between $SOC_1$ and $SOC_2$ satisfies Equation 1.

6. The method of claim 5, wherein the first positive electrode active material is represented by Formula 1 below:

$Li_{a1}CO_{1-x}1M^1_{x1}O_{2+\beta}$ [Formula 1]

in Formula 1, $M^1$ includes at least one selected from the group consisting of Al, B, Ba, Ca, Zr, Ti, Mg, Ta, Nb, Sr, W, and Mo, and $0.9<a1\leq1.1$, $0\leq x1\leq0.2$, and $0\leq\beta\leq0.02$.

7. The method of claim 5, wherein the step of preparing the second positive electrode active material further comprises a solid-phase reaction method process for preparing the second positive electrode active material.

8. The method of claim 5, wherein the step of preparing the second positive electrode active material further comprises a process for allowing the second positive electrode active material to contain a coated or doped element, and the total content of the coated or doped element to be 1,000 ppm or more.

9. The method of claim 5, wherein the first positive electrode active material and the second positive electrode active material are mixed at a weight ratio of 90:10 to 30:70.

10. A lithium secondary battery comprising the positive electrode for a lithium secondary battery according to claim 1.

* * * * *